United States Patent Office 3,640,959
Patented Feb. 8, 1972

3,640,959
CURED POLYFERROCENYLENES AND PROCESS FOR CURING
Norman Bilow, Los Angeles, Calif., and Harold Rosenberg, Dayton, Ohio, assignors to the United States of America as represented by the Secretary of the Air Force
No Drawing. Filed Mar. 6, 1969, Ser. No. 805,008
Int. Cl. C08g 3/00, 13/00
U.S. Cl. 260—64                                   11 Claims

ABSTRACT OF THE DISCLOSURE

Cured polyferrocenylenes and the process for curing them are disclosed. Low molecular weight thermoplastic polyferrocenylenes are reacted with aromatic dicarboxaldehydes. The resulting copolymers cross-link and cure to hard, heat-resistant, radiation-resistant structures upon treatment with heat and pressure.

BACKGROUND OF THE INVENTION

(1) Field of the invention

This invention relates to the process of reacting thermoplastic polyferrocenylenes with various aromatic dicarboxaldehydes in the presence of a suitable catalyst and thus producing new copolymers which are thermosetting.

(2) Description of the prior art

In the prior art, methods of synthesizing polyferrocenylenes have been described by various investigators. The polyferrocenylenes produced by the prior art have all had one property in common. They have all been thermoplastic or completely intractable and insoluble. Therefore, up to the present time, it has been impossible to take full advantage of the heat and radiation resistance or ablative properties potentially offered by the ferrocene moiety, especially in the field of reinforced composite structures.

SUMMARY OF THE INVENTION

This invention discloses a method for curing polyferrocenylenes and thus makes it possible to take full advantage of the heat and radiation resistance, as well as ablative and insulative properties, heretofore only potentially offered by the ferrocene moiety. In practicing the invention, one may utilize the lower molecular weight, organic-soluble fraction of polyferrocenylenes obtained from a variety of prior art methods. The said lower molecular weight portion may be isolated and treated with various dicarboxaldehyde curing agents described herein. Treatment of the polyferrocenylenes with the disclosed curing agents produces new copolymers. The copolymers produced are thermosetting, moldable and useful in the formation of laminates and filled composite structures where high heat resistance and radiation resistance are desirable properties.

DESCRIPTION OF THE PREFERRED EMBODIMENTS

In practicing this invention, typical polyferrocenylenes of the following types may be utilized:

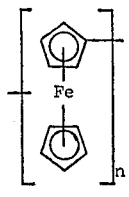
Type I

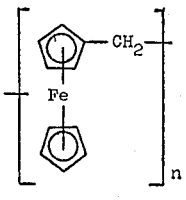
Type II

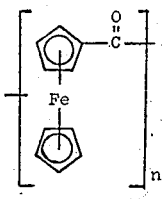
Type III where $n$ is an integer of about 2 to 15. Ring hydrogens of either or both of the polyferrocenylene rings may be replaced by another suitable radical. Among those that are suitable are radicals selected from the group consisting of $CH_3$, $C_2H_5$, $C_3H_7$, $C_4H_9$, $C_5H_{11}$, $C_6H_5$, Cl, F, Br, $CO_2CH_3$, $CO_2C_2H_5$, $C_6H_5CH_2$, $CH_3O$, $C_2H_5O$, and $CH_3S$.

Curing agents useful in the process are: terephthalaldehyde, isophthalaldehyde, 1,1′-ferrocenedicarboxaldehyde, 4,4′ - biphenyldicarboxaldehyde, 3,4′ - biphenyldicarboxaldehyde, 3,3′ - biphenyldicarboxaldehyde, and dicarboxaldehydes of the type

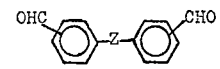

wherein the aldehyde groups are 3,3′; 3,4′; or 4,4′ and Z is O, $CH_2$, $C_2H_4$, $SO_2$, $C_6H_4$, S or various other connecting moieties such as other alkylene or arylene moieties.

Preferred catalysts are boron trifluoride, aluminum trichloride, zinc chloride or stannic chloride, with the former the most preferred.

The reaction may be generally illustrated as follows:

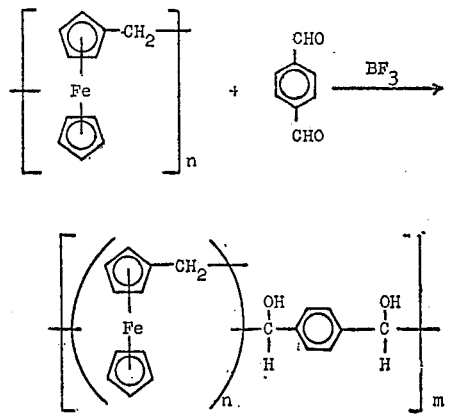

wherein $n$ is an integer of from 2 to 10. The letter $m$ is to indicate an integer which varies from about 2 to 20 and refers to the number of repeating units of a partially cured polymer which is suitable for molding purposes as compared to a very high, undetermined integer for the number of repeating units of the polymer in the form of a completely cured product which has been subjected to the heat and pressure of the molding process. The completely cured products are estimated to have molecular weights of over 100 thousand.

The following are more specific examples to better illustrate the invention. It should be recognized that any of the starting compounds and catalysts disclosed above could be utilized.

EXAMPLE I

Polyferrocenylene of Type I above (3.5 grams, 0.0026 mol) and analyzed to have a molecular weight of 1365 (analysis by vapor phase osmometry) and terephthaldehyde (1.2 grams, 0.009 mole) were dissolved in 20 ml. of anhydrous ether as completely as possible. Boron trifluoride etherate (0.1 gram, 0.0007 mole) was then added to the solution. The ether was removed by evaporation and the solid mixture ground to a fine powder. The powder was melted at 140° C. and reacted in its molten state for 11 minutes. After cooling, the partially cured product was found to be a polymer which melted at 60–90° C. It cured to a hard resin at 190° C.

In general, there are three ways by which reinforced composite articles may be prepared from the products of this invention. These methods are described below:

(1) In the first method appropriate amounts of ferrocenylene polymer (Type I, II, or III above), curing agent and catalyst may be dissolved in a lacquer or varnish type solvent such as methylene chloride. The lacquer or varnish thus prepared may then be used to coat a reinforcing agent such as carbon cloth or glass cloth. The solvent may then be removed by vacuum evaporation or by air drying and the dried coated fabric cut into plies, stacked, and molded under heat and pressure. This method is more effective where the reactant polymer has a molecular weight of from 1000 to about 4000.

(2) A second method is to melt suitable amounts of polyferrocenylene, curing agent and catalyst together in the absence of a solvent and reacting the materials until viscosity is suitable for folding or laminating. In this manner a partial cure is effected. When the proper viscosity has been obtained, reinforcing material may be coated, placed in a mold and subjected to heat and pressure. This method was used in a few cases where the reactant polymer had a molecular weight of less than 1000.

(3) A third method is to dissolve the still low molecular weight, partially cured, viscous polymer of method (2) in a suitable lacquer or varnish type solvent and then proceed with the coating in the manner disclosed by method (1).

All three methods give laminates with excellent properties.

Lacquer or varnish type solvents found useful in methods (1) and (3) include methylene chloride, chloroform, carbon tetrachloride, tetrachloroethylene, acetone, and methylethyl ketone. Suitable reinforcing materials include carbon cloth, glass fabric, quartz cloth, asbestos fibers and the like. Any reinforcement known in the art would be suitable.

Temperatures used in the molding process ranged from about 200° C. to about 350° C., and pressures used varied from 750 p.s.i. to about 4000 p.s.i. Molding times were in the range of from 30 minutes to about 2 hours. Generally about one hour of molding was sufficient to give an excellent laminated product.

EXAMPLE II

Polyferrocenylene of Type I above (6.0 grams, 0.0015 mole) having a molecular weight of 4000 and terephthalaldehyde (0.7 gram, 0.005 mole) was dissolved in 20 ml. of methylene chloride and boron trifluoride etherate (0.2 gram, 0.0014 mole) was added. The solution was warmed at 40° C. for 30 minutes. The lacquer thus formed was applied as a coat to carbon cloth and dried. The coated carbon cloth was then cut into plies. The plies were stacked in a mold and cured for approximately one hour at 288° C. and 2500 p.s.i. The result was a laminate with very good properties.

EXAMPLE III

Other typical examples of the fabrication of terephthalaldehyde-cured polyferrocenylene laminates are tabulated in the accompanying table. These examples utilized Type I polyferroceneylenes in the 1100 to 4000 mean molecular weight range.

COMPOSITION AND FABRICATION PARAMETERS ON VARIOUS TEREPHTHALALDEHYDE-CURED POLYFERROCENYLENE LAMINATES

| Sample | Polyferrocenylene | | | Curing agent | | Catalyst, BF₃-etherate | | Lacquer solvent | Advancing tempera- ° C. | Time, hours | Molding temper- ature, ° C. | Molding pressure, p.s.i. | Rein- force- ment | Resin content, percent | Sample size, diameter |
|---|---|---|---|---|---|---|---|---|---|---|---|---|---|---|---|
| | Grams | Moles | M3 | Grams | Moles | Grams | Moles | | | | | | | | |
| 1 | 6.0 | 0.0015 | 4,000 | 0.7 | 0.005 | 0.20 | 0.0014 | CH₂Cl₂ | 40 | 0.50 | 288 | 2,500 | CCA-1 | 100 | ¾″ |
| 2 | 3.5 | 0.0026 | 1,365 | 1.2 | 0.009 | 0.10 | 0.0007 | CH₂Cl₂ | 140 | 0.15 | 288 | 2,000 | CCA-1 | | ¾″ |
| 3 | 9.0 | 0.0070 | 1,290 | 3.0 | 0.024 | 0.50 | 0.0035 | CH₂Cl₂ | | | 200–315 | 4,000 | 181-E | 29 | ¾″ |
| 4 | 36 | 0.0190 | 1,880 | 12.0 | 0.089 | 1.00 | 0.0070 | CH₂Cl₂ | | | 315 | 2,000 | CCA-1 | 30 | 2″ |
| 5 | 48 | 0.0260 | 1,880 | 16.0 | 0.120 | 1.30 | 0.0091 | CH₂Cl₂ | | | 315 | 2,000 | CAA-1 | | 2″ |
| 6 | 20 | 0.0100 | 2,020 | 4.0 | 0.030 | 0.25 | 0.0018 | CH₂Cl₂ | | | 315 | 750 | 181-E | 27 | |
| 7 | 20 | 0.0100 | 2,020 | 2.7 | 0.020 | 0.25 | 0.0018 | CH₂Cl₂ | | | 315 | 750 | 181-E | 44 | |
| 8 | 20 | 0.0100 | 2,020 | 4.0 | 0.030 | 0.25 | 0.0018 | CH₂Cl₂ | | | 315 | 1,000 | 181-E | 43 | |
| 9 | 18 | 0.0090 | 2,020 | 6.0 | 0.045 | 0.63 | 0.0044 | CH₂Cl₂ | | | 315 | 1,000 | 181-E | 36 | |
| 10¹ | 18.5 | 0.0160 | 1,100 | 6.0 | 0.045 | 0.63 | 0.0044 | CH₂Cl₂ | | | 343 | 1,000 | 181-E | 29 | |

¹ 10 = 92% polyferrocene (2,020) plus 8% ferrocene.
NOTE.—CCA-1 = CCA-1 carbon cloth; 181-E = 181-E glass cloth.

Not only are these polymers useful as matrix resins for structural laminates and fabric reinforced ablative and insulative composites, but they are also useful in fabricating filled resinous compositions wherein fillers such as various clays, silica, powdered glass, mica, minerals, pulverized thermoset phenol-formaldehyde resin, sodium aluminum silicate, and carbon are incorporated therein.

Fillers may be incorporated by grinding them together with the ferrocene polymer prior to curing the polymer or by blending the filler with a solution of the uncured ferrocene polymer and subsequently removing the resin solvent by evaporation.

The list of useful fillers indicated above is presented to provide illustrative examples but is not intended to limit the scope of this invention. Filler content may be as low as 1% or less or as high as 80%. For certain fillers this upper limit is only 40–60% depending upon the density of the selected filler. Mixtures of fillers may also be used.

We claim:
1. The copolymers consisting essentially of the general formula:

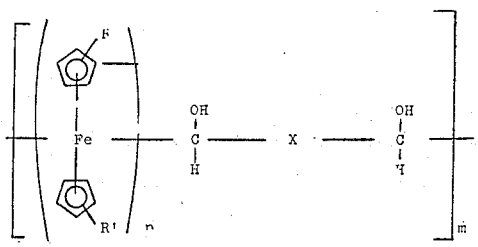

wherein $n$ is an integer of from 2 to 10, wherein $m$ is an integer of from 2 to 20, wherein R and R′ are selected from the group consisting of H, $CH_3$, $C_2H_5$, $C_3H_7$, $C_4H_9$, $C_5H_{11}$, $C_6H_5$, Cl, F, Br, $CO_2CH_3$, $CO_2C_2H_5$, $C_6H_5CH_2$, $CH_3O$, $C_2H_5O$, and $CH_3S$, and wherein X is selected from the group of diradicals consisting of $C_6H_4$, $C_6H_4$–$C_6H_4$, $C_5H_4FeC_5H_4$ and $C_6H_4$–Z–$C_6H_4$ in which Z is selected from the group consisting of O, S, $CH_2$, $C_2H_4$, $SO_2$ and $C_6H_4$.

2. The copolymers consisting essentially of the general formula:

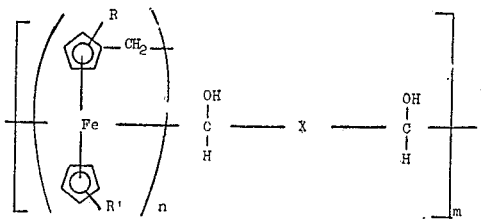

wherein n is an integer of from 2 to 10, wherein m is an integer of from 2 to 20, wherein R and R' are selected from the group consisting of H, CH₃, C₂H₅, C₃H₇, C₄H₉, C₅H₁₁, C₆H₅, Cl, F, Br, CO₂CH₃, CO₂C₂H₅, C₆H₅CH₂, CH₃O, C₂H₅O, and CH₃S, and wherein X is selected from the group of diradicals consisting of C₆H₄, C₆H₄–C₆H₄, C₅H₄FeC₅H₄ and C₆H₄–Z–C₆H₄ in which Z is selected from the group consisting of O, S, CH₂, C₂H₄, SO₂ and C₆H₄.

3. The copolymers consisting essentially of the general formula:

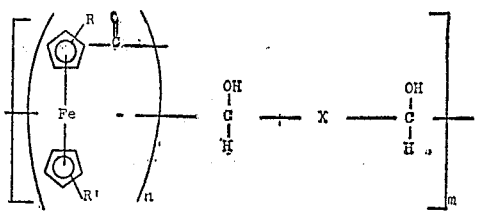

wherein n is an integer of from 2 to 10, wherein m is an integer of from 2 to 20, wherein R and R' are selected from the group consisting of H, CH₃, C₂H₅, C₃H₇, C₄H₉, C₅H₁₁, C₆H₅ Cl, F, Br, CO₂CH₃, CO₂C₂H₅, C₆H₅CH₂, CH₃O, C₂H₅O, and CH₃S, and wherein X is selected from the group of diradicals consisting of C₆H₄, C₆H₄–C₆H₄, C₅H₄FeC₅H₄ and C₆H₄–Z–C₆H₄ in which Z is selected from the group consisting of O, S, CH₂, C₂H₄, SO₂ and C₆H₄.

4. The process of forming copolymers of polyferrocenylenes and dicarboxaldehydes which comprises reacting a polyferrocenylene selected from the group consisting of

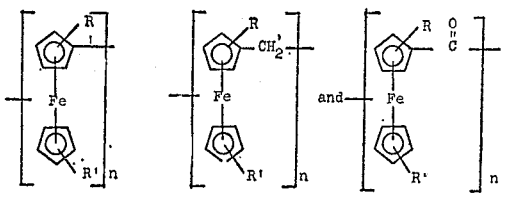

wherein n is an integer of from 2 to 10 and R and R' are selected from the group consisting of H, CH₃, C₂H₅, C₃H₇, C₄H₉, C₅H₁₁, C₆H₅, Cl, F, Br, CO₂CH₃, CO₂C₂H₅, C₆H₅CH₂, CH₃O, C₂H₅O, and CH₃S with a dicarboxaldehyde selected from the group consisting of terephthalaldehyde, isophthalaldehyde, 4,4' - biphenyldicarboxaldehyde, 3,4' - biphenyldicarboxaldehyde, 3,3' - biphenyldicarboxaldehyde, 1,1' - ferrocenedicarboxaldehyde and dicarboxaldehydes of the type having the formula

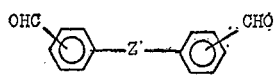

wherein the aldehyde groups are located in the 3,3'; 3,4'; or 4,4' positions and wherein Z is selected from the group consisting of O, S, CH₂, C₂H₄, SO₂ and C₆H₄ in the presence of a catalyst selected from the group consisting of boron trifluoride etherate, boron trifluoride, aluminum trichloride, zinc chloride and stannic chloride said reaction being conducted in the presence of a solvent selected from the group consisting of methylene chloride, chloroform, carbon tetrachloride, tetrachloroethylene, acetone and methyl ethyl acetone which is inert to the reactants.

5. A process according to claim 4 wherein said copolymer is recovered by removing said solvent.

6. A process according to claim 5 wherein said copolymer is cured by heating under pressure.

7. A process according to claim 6 wherein a filler is mixed with said copolymer prior to curing by heating under pressure.

8. The cured copolymer produced by the process of claim 6.

9. The filled, cured copolymer produced by the process of claim 7.

10. The process of forming copolymers of polyferrocenylenes and dicarboxaldehydes which comprises:

(a) mixing a compound selected from the group consisting of

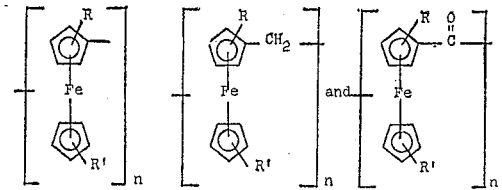

wherein n is an integer of from 2 to 10 and R and R' are selected from the group consisting of H, CH₃, C₂H₅, C₃H₇, C₄H₉, C₅H₁₁, C₆H₅, Cl, F, Br, CO₂CH₃, CO₂C₂H₅, C₆H₅CH₂, CH₃O, C₂H₅O, and CH₃S; with a dicarboxaldehyde selected from the group consisting of terephthalaldehyde, isophthalaldehyde, 4,4'-biphenyldicarboxaldehyde, 3,4' - biphenyldicarboxaldehyde, 3,3' - biphenyldicarboxaldehyde, 1,1'-ferrocenedicarboxaldehyde, and dicarboxaldehydes of the type having the formula

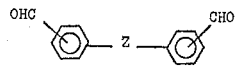

wherein the aldehyde groups are located in the 3,3'; 3,4'; or 4,4' positions and wherein Z is selected from the group consisting of O, S, CH₂, C₂H₄, SO₂ and C₆H₄ and a catalyst selected from the group consisting of boron trifluoride etherate, boron trifluoride, aluminum trichloride, zinc chloride, and stannic chloride; and (b) melting the mixture so that said compound and said dicarboxaldehyde react to form said copolymer.

11. A process according to claim 10 wherein the copolymer is further heated under pressure to effect a cure.

References Cited

UNITED STATES PATENTS

| | | | |
|---|---|---|---|
| 3,437,634 | 4/1969 | Neuse | 260—47 |
| 3,437,644 | 4/1969 | Neuse et al. | 260—80 |
| 3,448,082 | 6/1969 | McGrath et al. | 260—67 |
| 3,504,052 | 3/1970 | Neuse et al. | 260—86 |

WILLIAM H. SHORT, Primary Examiner

L. L. LEE, Assistant Examiner

U.S. Cl. X.R.

117—124 E, 161 L; 161—198; 260—32.8 R, 33.8 R, 67 R